US010771441B2

(12) United States Patent
Neumann et al.

(10) Patent No.: US 10,771,441 B2
(45) Date of Patent: Sep. 8, 2020

(54) METHOD OF SECURING AUTHENTICATION IN ELECTRONIC COMMUNICATION

(71) Applicant: ADUCID S.R.O., Brno-Prizrenice (CZ)

(72) Inventors: Libor Neumann, Prague (CZ); Vlastimil Klima, Prague (CZ)

(73) Assignee: ADUCID S.R.O., Brno-Prizrenice (CZ)

( * ) Notice: Subject to any disclaimer, the term of this patent is extended or adjusted under 35 U.S.C. 154(b) by 184 days.

(21) Appl. No.: 15/737,684

(22) PCT Filed: Jul. 6, 2016

(86) PCT No.: PCT/CZ2016/050025
§ 371 (c)(1),
(2) Date: Dec. 18, 2017

(87) PCT Pub. No.: WO2017/005233
PCT Pub. Date: Jan. 12, 2017

(65) Prior Publication Data
US 2018/0183765 A1 Jun. 28, 2018

(30) Foreign Application Priority Data
Jul. 7, 2015 (CS) ................................. 2015-473

(51) Int. Cl.
*H04L 29/06* (2006.01)
*H04L 9/08* (2006.01)
(Continued)

(52) U.S. Cl.
CPC .......... *H04L 63/045* (2013.01); *H04L 9/0861* (2013.01); *H04L 9/14* (2013.01);
(Continued)

(58) Field of Classification Search
CPC ... H04L 63/045; H04L 63/083; H04L 9/3247; H04L 9/0861; H04L 9/14; H04L 63/0428; H04L 63/0838; H04L 2463/082
See application file for complete search history.

(56) References Cited

U.S. PATENT DOCUMENTS

| 4,393,269 | A | * | 7/1983 | Konheim | ............. G06Q 20/401 |
|||||| 705/75 |
| 9,083,527 | B1 | * | 7/2015 | McCorkendale | ..... H04L 9/3236 |

(Continued)

FOREIGN PATENT DOCUMENTS

WO 03/001734 A1 1/2003

OTHER PUBLICATIONS

International Search Report and Written Opinion for PCT/CZ2016/050025 filed Jul. 6, 2016.
(Continued)

*Primary Examiner* — Abu S Sholeman
(74) *Attorney, Agent, or Firm* — Notaro, Michalos & Zaccaria P.C.

(57) ABSTRACT

A method of securing authentication in electronic communication between at least one user authentication mechanism and at least one server authentication mechanism, wherein primary authentication is performed in the first step, and during the primary authentication a secondary authentication secret is created and shared between the user authentication and the server authentication mechanisms and is valid only for the given authentication transaction, and the secondary authentication secret is subsequently used as an input for a cryptographic transformation performed by the user authentication mechanism separately on each authentication vector element while creating the first authentication vector product, wherein authentication vector (AV) is an ordered set of authentication vector elements (AVE)(i)), wherein the first authentication vector product is transferred from the
(Continued)

user authentication mechanism to the server authentication mechanism and is evaluated by the server authentication mechanism using the secondary authentication secret.

17 Claims, 2 Drawing Sheets

(51) Int. Cl.
  *H04L 9/14* (2006.01)
  *H04L 9/32* (2006.01)
(52) U.S. Cl.
  CPC ........ *H04L 9/3247* (2013.01); *H04L 63/0428* (2013.01); *H04L 63/083* (2013.01); *H04L 63/0838* (2013.01); *H04L 2463/082* (2013.01)

(56) References Cited

U.S. PATENT DOCUMENTS

| | | | |
|---|---|---|---|
| 9,430,655 B1* | 8/2016 | Stockton | H04L 9/3066 |
| 2003/0172268 A1* | 9/2003 | Walmsley | H04L 9/002 713/168 |
| 2009/0287922 A1* | 11/2009 | Herwono | H04L 9/0822 713/155 |
| 2010/0205661 A1* | 8/2010 | Neumann | H04L 63/0869 726/6 |
| 2013/0124292 A1* | 5/2013 | Juthani | G06F 21/41 705/14.26 |
| 2016/0262021 A1* | 9/2016 | Lee | H04L 63/0807 |
| 2016/0323275 A1* | 11/2016 | Choi | H04L 9/321 |

OTHER PUBLICATIONS

Anonymous: "Encrypting One Time Passwords Systems—Defuse Security", Apr. 3, 2015, Retrieved from the Internet: URL: https://web.archive.org/web/20150403202043/https://defuse.ca/eotp.htm retrieved Sep. 13, 2016.

\* cited by examiner

METHOD OF SECURING AUTHENTICATION IN ELECTRONIC COMMUNICATION

FIELD OF ART

The invention relates to the field of security of information and communication technologies. The invention relates to security of appliances, especially devices used for authentication in local or remote electronic communication, against misuse by unauthorised persons.

BACKGROUND ART

Various means are used for secure protected electronic communication (authentication) which offer various levels of security, i.e. various levels of resilience against misuse by an unauthorised person. To enhance security, various methods are used which are directed against various methods of possible abuse. The main risks of abuse of authentication means used in electronic communication include gaining access to these means or to the secret information used by such means for authentication.

A very widespread method of authentication by means of login and password entered by the user is very sensitive to the situation where the attacker succeeds in gaining information about the password used. The attacker can do this, e.g. by observing the keyboard used by the user for entering the password, tracing communication in the data network where the password is transferred, reading information from the database of the service provider which is used for checking passwords or by fraudulently acquiring the password from the user (phishing).

A plurality of authentication factors is used to reduce the risks related to misuse of authentication means. Instead of cracking just one authentication factor, the attacker must crack all the authentication factors used. Smart payment cards represent a very well-known and widespread two-factor authentication means. The user has a chip card which functions only if a PIN (secret number) is entered. The attacker must acquire the payment card and guess or otherwise obtain the PIN in order to misuse the card.

Specially designed devices are used to reduce the risks associated with the abuse of authentication means; these devices provide enhanced protection to the secret information used for authentication which is stored on the authentication means. This reduces the risk of the attacker getting hold of such information by reading information from a (local or remote) authentication device. Examples include specialised authentication tokens and calculators and smart cards and USB token with a built-in smart chip.

As a rule, the safer an authentication solution is, the more complexity and user complicacy it involves. To address this, there exist solutions that risk possible copying of secret information used by the attacker for authentication to reduce the costs of using such authentication means, complexity for the user and demands on special knowledge and skills normally required by specialised devices. An example is installing an authentication X.509 certificate (with a private key) on a PC disk or on a common USB memory token.

The solutions used in practice have numerous disadvantages leading either to a low security, i.e. greater chances for attackers to abuse such authentication means, or to expensive and user-complex solutions that users are reluctant or unable to use.

The disadvantages of the existing solutions include the fact that the protection against abuse is a default part of the relevant authentication means and is used independently of the level of security that would be commensurate to the specific use of the authentication means at the given moment. As a result, the authentication either lacks security in case of use with high security level requirements if the criterion of comfort for the client of the electronic service prevails, or the authentication means are unreasonably complicated to operate when used for services with usual security level requirements and thus not acceptable for the user.

The disadvantages of such solutions also include the fact that the second and any further factor is evaluated directly by the authentication device before the actual authentication begins. An attacker may acquire the device and find ways of bypassing its protective mechanisms. The attacker either bypasses the necessity to use the second factor or has a sufficient number of guesses or finds another way of obtaining information about the second factor from the authentication device.

In addition, the user must use several different authentication means for different services, which complicates the security procedures, reduces the overall security of electronic communication and electronic services and, ultimately, increases the costs.

Disclosure of the Invention

The present invention provides a method of securing authentication in electronic communication between at least one user authentication means and at least one server authentication means, wherein in the first step, primary authentication is performed, a secondary authentication secret (SAS) is created within the primary authentication, said secondary authentication secret is shared between the user authentication means and the server authentication means and is valid only for the given authentication transaction; and said secondary authentication secret is subsequently used as an input (parameter) for a transformation, preferably for a cryptographic transformation, performed by the user authentication means separately on each authentication vector element (AVE) while creating first authentication vector element products (AVEP), wherein an authentication vector (AV) is an ordered set of authentication vector elements (AVE(i)) and a first authentication vector product (AVP) is an ordered set of corresponding first authentication vector element products (AVEP(i)) which is transferred from the user authentication means to the server authentication means and is evaluated by the server authentication means using the secondary authentication secret.

Preferably, the user authentication means stores the values of the authentication vector elements and/or the values are entered by the user or obtained from an information medium or from the outer environment before or during the authentication transaction and/or the values are obtained, before or during the authentication transaction, from transformed values of the authentication vector elements (T-AVE(i)) using information entered by the user or obtained from an information medium or the outer environment, and the server authentication means stores the reference values of the authentication vector elements (AVER(i)) or obtains them before or during the authentication transaction from an information medium or from the outer environment.

Transformation can include, for example, adding SAS, concatenation with SAS, bit manipulations with SAS, cryptographic transformations, etc.

Cryptographic transformation can be one-way (e.g. the hash function) or two-way (e.g. encryption and decryption).

Authentication vector element (AVE) is an authentication element used for partial authentication. Individual AVEs have a unique index (i—index), the notation is AVE(i). The relevant AVE(i) is unambiguously assigned to the purpose of its use.

An authentication vector element (AVE) can be used for various purposes, for example to verify another authentication factor or for protection against copying authentication secret. Preferably, individual authentication vector elements are selected from a group comprising data from preceding authentication transactions, data relating to identification of the user authentication means, data relating to local authentication factor, data relating to data channel secret, etc.

Authentication vector (AV) is an ordered set of AVE(i). The number and selection of AVEs for a specific use of AV in a specific authentication transaction can be different than in the previous or subsequent authentication transaction. The selection of AVEs used in the given specific authentication transaction can be directly or indirectly controlled by the server authentication means on the basis of requests of the target application using the authentication, preferably on-line requests.

Reference value of an authentication vector element (AVER(i)—Authentication Vector Element Reference) is a value destined for verifying accuracy of the AVE(i). It is a value created before verification of the AVE(i) in a manner corresponding to the purpose of AVE(i).

Authentication vector element product (AVEP(i)) represents information obtained by transformation of the corresponding AVE(i) using secondary authentication secret; preferably, the transformation is a cryptographic transformation. Authentication vector product AVP is an ordered set of AVEP(i).

Secondary authentication secret (SAS) represents a shared secret created and authenticated within the primary authentication, e.g. using primary authentication secret. It is a pseudo-random secret information known only to the two parties taking part in the authentication, i.e. the user authentication means and the server authentication means. SAS is valid only during authentication (authentication process, authentication transaction) and is created so that it is not predictable even if the primary authentication secret is known. The processes of primary authentication and the processes of creating a shared secondary authentication secret are known in the art.

In one embodiment of the invention, the first authentication vector product on the server authentication means is evaluated in such a way that a second authentication vector product is created in the server authentication means from the authentication vector element reference values stored on the server authentication means by using the secondary authentication secret as an input of a cryptographic transformation performed by the server authentication means separately on each authentication vector element, and the first and second authentication vector products are compared.

In another embodiment of the invention, the first authentication vector product on the server authentication means is evaluated so that in the server authentication means, each first authentication vector element product is separately subjected to inverse transformation to the transformation used by the user authentication means and the result is evaluated using authentication vector element reference values.

In one embodiment, all authentication vector elements are used in every authentication transaction.

In another embodiment of the invention, only some authentication vector elements are used in various authentication transactions, wherein the information on which authentication vector elements will be used in the given authentication transaction are transmitted from the server authentication means to the user authentication means during the authentication transaction. This ensures an easy adaptation to the demands on security of each specific authentication transaction.

Individual authentication vector elements AVE(i) are determined before using AV, including the purpose of use of each AVE(i). The determination of AVE(i) is valid for all subsequent authentications until the assignment is changed.

It can be determined before each individual authentication transaction which particular authentication vector elements AVE(i) will be used in that transaction and which ones will not be used in that transaction. This control information is transmitted to the server authentication means. In one preferred embodiment, the server authentication means determines, on the basis of the control information, which authentication vector elements AVE(i) will be used in the authentication transaction, transmits the information to the user authentication means and the latter creates the first authentication vector product using only the thus Bete; mined elements AVE(i). If the user authentication means is unable to obtain the value of an element AVE(i), and hence the corresponding element of the first authentication vector element product AVEP(i), it informs the server of this fact. The server includes the information on the absent value in the authentication evaluation.

The first step of any given authentication consists in primary authentication, e.g. using primary authentication secret, and in creation of secondary authentication secret (SAS).

Control information determining which specific elements of the authentication vector AVE(i) shall be used and which shall not be used in said authentication can be transferred in a secure manner from the server authentication means to the user authentication means. The SAS or an information derived from the SAS can be used for protecting the transfer.

The user authentication means obtains information required for fulfillment of the purpose of each individual authentication vector element AVE(i) to be used. The user authentication means obtains and processes this information in a manner appropriate to the purpose of use. In this manner, the user authentication means obtains the values of all authentication vector elements AVE(i). Using a transformation, the user authentication means calculates an authentication vector element product AVEP(i) from each authentication vector element AVE(i) and from secondary authentication secret SAS.

All the thus calculated authentication vector element products AVEP(i) are securely transferred from the user authentication means to the server authentication means as the first authentication vector product. The secondary authentication secret SAS or an information derived from the SAS can be used for protecting the transfer.

Depending on the purpose of use of each individual authentication vector element AVE(i), the server authentication means directly passes over the result of evaluation of the authentication vector element AVE(i) used in the authentication to the target application as part of the result of authentication, or performs another processing or other actions or activities.

In a preferred embodiment, the authentication vector contains at least one element the purpose of which is to detect copying of the user authentication means. M authentication vector elements are used for this purpose. We shall denote these elements as AC-AVE(i) (AntiCopy Authentization Vector Element).

Each of the M elements AC-AVE(i), wherein i–1 to M, is assigned to one of the previous authentications; preferably AC-AVE(1) is assigned to the immediately preceding authentication, AC-AVE(2) to the authentication preceding said authentication, and AC-AVE(j) is assigned to the j-th preceding authentication. The AC-AVE(i) elements correspond to the information which is unambiguously assigned to the relevant preceding authentication transaction and is known only to the two parties to the transaction.

Preferably, said information can be represented e.g. by SAS or by a value cryptographically derived from SAS, preferably using one-way cryptographic transformation. Each authentication is performed so that an authenticated SAS is created which is valid and known only in that authentication. The same SAS is available to the user authentication means and the server authentication means in the given authentication. During the authentication transaction, the user authentication means and the server authentication means independently use SAS to calculate a new AC-AVE value for this authentication using cryptographic transformation (for security reasons, it is preferred to use one-way cryptographic transformation). We shall denote it as AC-AVE(0).

From the AC-AVE(i) values previously created and stored, wherein i=1 to M, the user authentication means creates authentication vector element products AVEP(i) and transmits it over to the server means for evaluation. The creation of AVEP(i) is performed using a transformation employing SAS as an input (parameter).

After calculating AC-AVE(0), the user authentication means moves the previously recorded AC-AVE(i) values so that it records the AC-AVE(0) value as AC-AVE(1) after moving the AC-AVE(1) value to AC-AVE(2) etc. This means that in each authentication performed, the newly calculated AC-AVE(0) value is put to the beginning of the list of AC-AVE(i) values and the other values are moved by one position towards the end of the list of values.

The server authentication means uses the calculated AC-AVE(0) as the relevant reference value of the authentication vector element AC-AVER(0).

The server authentication means uses the previously recorded AC-AVER(i) values, wherein i=1 M, to verify match with the values transmitted by the user authentication means for verification by creating, after moving the previously recorded AC-AVER(i–1) values to AC-AVE(i), authentication vector element products through the same transformation using SAS as input and compares them with the values received from the user authentication means.

The server authentication means also records the newly calculated. AC-AVE(0) value and, at the same time, moves the previously recorded AC-AVER(i) values in that it records the AC-AVE(0) value as AC-AVER(1) after moving the AC-AVER(1) value to AC-AVER(2) etc. This means that in each authentication performed, the newly calculated AC-AVE(0) value is put to the beginning of the list of AC-AVER (i) values and the other values are moved by one position towards the end of the list of values.

The AC-AVEP(i) elements, wherein i–1 to M, are evaluated so as to distinguish between situations where a technical problem has occurred on the part of the user authentication means or on the part of the server authentication means from a situation where the data were copied from the user authentication means and used by another user authentication means.

Preferably, the evaluation distinguishes between the following situations:
All AC-AVE(i) elements are evaluated as identical with AC-AVER(i). This means that no technical problem has occurred and no copy was used.
All AC-AVE(i) elements, with the exception of n adjoining elements at the beginning of the list, are identical with AC-AVER(i+/−n), i.e. with the reference elements moved by n positions forwards or backwards. This means that a technical problem has occurred in n consecutive authentications either on the user authentication means or on the server authentication means. When the technical problem is detected, a note is attached to the relevant AC-AVER(i) that such a situation was evaluated and said information is used in the subsequent evaluations where the values gradually disappear from the beginning of the list.
If any other mismatch is detected, i.e. one or several of the AC-AVE(i) elements differ from AC-AVER(i) in a manner which does not correspond to a technical problem of the user authentication means or the server authentication means. This means that a copy of the authentication secret was obtained and at least once used.

If the existence and use of a copy of the authentication secret is thus detected, this fact is signalled as an output of the means of protection of authentication means against misuse and can be used for recovery measures such as blocking the authentication means, making the copy different from the original by a forced intervention, etc.

In one preferred embodiment, the authentication vector contains at least one element the purpose of which is to verify local authentication factors. The user authentication means obtains the value of a local authentication factor (LAF) from the outer environment and the reference value of the authentication vector element LF-AVER(i) stored on the server authentication means is then represented either directly by the local authentication factor, by an information derived from the local authentication factor or by a reference information, wherein said reference information is independent of the local authentication factor if LF-AVER(i) is reference information.

Local authentication factor (LAF) represents information obtained by the technical equipment of the user authentication means from the physical outer environment of that means, or directly from the user, for the purpose of verifying that the user authentication means is held by an authorised user. Local authentication factor can be represented by an information which must be entered by the user (e.g. PIN, password) or information obtained from an object which is to be possessed by the authorised user only (e.g. wireless payment card), or recognition of biometric features or behavioural biometrics of the authorised user (e.g. obtaining face image, fingerprint, gesture, regular habits, etc.)

K authentication vector elements are used to verify L local authentication factors, wherein K>=L. We shall denote these elements as LF-AVE(i) (Local Factor Authentication Vector Element), wherein i=1 to K.

The number of LAFs which are verified need not be always identical; it can be determined by the request of the server authentication means which specifies whether and which LAFs should be obtained by the user authentication means in the given transaction and used for verification. The number of obtained LAFs need not be always identical with the number of verified LAFs. LAFs obtained in the past and stored by the user authentication means can also be used for verification during a period of time permitted for reuse of the LAFs. The permitted period can either be set by the user of the user authentication means or form part of the request of the server authentication means or it can be configured remotely using the server authentication means on the user authentication means.

When a LAF is defined (initialised, created), initialisation of the LAF verification means is performed by both the user authentication means and the server authentication means. The value of LF-AVE(i), i.e. the element obtained by the user authentication means corresponding to the LAF, can be represented either directly by LAF or by an information derived from LAF or by a reference information transformed by cryptographic transformation using the LAF as an input (parameter). The LF-AVER(i) value, i.e. the reference value stored on the server authentication means is then, correspondingly, represented either by LAF or by an information derived from LAF or by a reference information. If LF-AVER(i) is represented by a reference information, that reference information is independent of LAF.

Verification whether a specific LAF including the LF-AVE(i) value produced by that LAF belongs to an authorised user can be carried out during or after defining the LAF (e.g. using organisational means such as entering LAF for the first time in the presence of a trustworthy person, governmental authority or by e-mail).

If LF-AVER(i) is represented by a reference information independent of LAF, the initialisation of LF-AVE(i) means is performed on the user authentication means as follows:

Reference LAF is obtained (e.g. first entering and verification of password or PIN, use of the relevant identification object, obtaining a reference image of the face or the fingerprint). The result of obtaining the reference LAF is a reference value or set of local reference values (we shall denote them as LAF-RV(i)—Local Authentication Factor Reference Value). It can be represented by a single value or several values.

At the same time, a corresponding number of derived reference values of the authentication vector element LF-AVER(i) is created pseudo-randomly from SAS.

The mutually corresponding LAF-RV(i) and LF-AVER(i) are used as inputs of a cryptographic transformation (e.g. encryption of LF-AVER(i) using LAF-RV(i)). The result of the cryptographic transformation is stored on the user authentication means for further use and is not transferred to any other location. We shall denote this value as T-AVE(i) (Transformed Authentication Vector Element).

At the same time, the relevant reference value of the relevant LF-AVER(i) authentication vector element, which is calculated in the same manner from SAS on the server authentication means, is stored on the server authentication means.

This process is applied to all values of all LAFs and need not be performed for all values, or for all LAFs, at once. Instead, it can be a gradual process where the values of the initialised individual LAFs can be used for verification even before initialisation of other values or other LAFs.

LAF(i) verification is performed as follows:

The user authentication means obtains LAF and creates the corresponding value(s) or a LAF obtained earlier and its value(s) stored in memory are used (we shall denote this as LAF-VV(i)—Local Authentication Factor Verified Value:

The previously initialised and recorded relevant value of T-AVE(i) and the LAF-VV(i) are the input of an inverse cryptographic transformation to the cryptographic transformation used in the initialisation process (e.g. decryption of T-AVE(i) using LAF-VV(i)).

The output of the inverse cryptographic transformation used as the value of the authentication vector element LF-AVE(i). The above-described mechanism of verification of the authentication vector element is used for verification.

The mechanism is used separately for each value of each LAF and is separately evaluated.

In a preferred embodiment, the authentication vector contains at least one element the purpose of which is to authenticate a non-authenticated data channel. A single authentication vector element AVE(i) is sufficient for this purpose but a plurality of AVE(i) can also be used.

The data channel between the user part and the server part creates an internal secret used for protection of the data channel (e.g. encryption and protection of integrity of the transferred data). Using one-way transformation, the client part of the data channel creates Data Channel Secret Exporter (DCSE) from the data channel internal secret.

The server part of the data channel also creates an identical Data Channel Secret Exporter.

The user authentication means obtains the DCSE from the client part of the data channel and the server authentication means obtains the DCSE from the server part of the data channel.

The user authentication means uses the obtained DCSE as the authentication vector element AVE(i) and the server authentication means uses the obtained DSCE as the reference value of authentication vector element AVER(i).

The corresponding authentication vector element is evaluated in the manner described above, whereby the data channel is authenticated by secondary authentication secret SAS which was authenticated by the (primary) authentication secret.

In a preferred embodiment of the invention, the authentication vector contains at least one element the purpose of which is to verify the user authentication means (i.e. verification of authenticity, identity of the device, e.g. internal identification data), which is identified by one or several identifiers until the identifiers on the individual parts of the device are identical. We shall denote the device identifier as DI(i).

By using DI(i) as LF-AVE(i), it is possible to verify that the device used is identical to the device at the time of initialisation of LAF(i). DI(i) can be initialised during the first use of the user authentication means.

In a preferred embodiment of the invention, the authentication vector contains at least one element the purpose of which is to eliminate an attacker by means of data channel. A single authentication vector element AVE(i) is sufficient for this purpose but a plurality of them can be used.

Data channel secondary secret DCSS is created using the data channel between the client part and the server part, DCSS can be represented by, for example, data channel secret exporter (DOSE) or data channel transported secret (DCTS).

The user authentication means obtains the DCSS from the client part of the data channel and the server authentication means obtains the DCSS from the server part of the data channel.

We shall denote the public key of the (primary) authentication secret of the user authentication means as CPuK (Client PublicKey).

The user authentication means calculates the value of this authentication vector element AVE(i) using a one-way transformation applied to the CPuK and the DCSS value obtained from the client part.

The server authentication means calculates the reference value of this authentication vector element AVER(i) using the same one-way transformation applied to the CPuK and the DCSS value obtained from the server part of data channel. The server authentication means uses the CPuK value known to it, which the server authentication means uses for primary authentication of the user authentication means.

The relevant authentication vector element is evaluated in the above-described manner, whereby an active MITM (Man-In-The-Middle) attack against primary authentication is eliminated provided that the attacker is not present on the data channel and, at the same time, between the user authentication means and the server authentication means.

In a preferred embodiment of the invention, the authentication vector contains at least one element the purpose of which is to eliminate an attacker using a replica. In this embodiment, two user authentication means, one server authentication means and two interrelated secrets—K and PK—are used. The first user authentication means creates a random secret PK and derives from it secret K by a one-way cryptographic transformation, e.g. by hash function.

The first user authentication means directly transmits the secret PK to the second user authentication means.

The second user authentication means derives the secret K from the obtained secret PK using the one-way cryptographic transformation, e.g. the hash function.

To eliminate an attacker, it is further necessary to verify, in the correct order using the user authentication means, that the same secret K or PK is available to the server authentication means and also to verify using the server authentication means that the same secret K or PK is available to the user authentication means.

The one-way dependence between the secrets, i.e. the fact that K can be calculated from PK but PK cannot be calculated from K, is exploited in this process.

To eliminate an attacker, it is first necessary to verify the secret K of the first user authentication means using the server authentication means, then the secret PK of the second user authentication means needs to be verified using the server authentication means, and the secret K of the server authentication means is subsequently verified using the first user authentication means and, finally, the secret PK of the server authentication means is verified using the second user authentication means.

Hence, the secret K is first transferred from the second user authentication means to the server authentication means and the secret PK is then transferred from the first user authentication means to the server authentication means.

Two authentication vector elements AVE(k) and AVE(pk) are used to verify secrets K and PK.

In verification using the server authentication means, the authentication vector element product (AVEP) is calculated using the user authentication means, The evaluation by comparison with the reference value of the authentication vector element (AVER), or an information derived therefrom, is performed by the server authentication means.

In verification using the user authentication means, the authentication vector element product (AVEP) is calculated using the server authentication means and evaluation by comparison with the reference value of the authentication vector element (AVER), or its derived information, is performed by the user authentication means.

The authentication vector element product (AVEP) is calculated from the secret K or PK and the secret K or PK is used as the reference value of the authentication vector element (AVER).

Since secrets K and PK were calculated by both user authentication means at the beginning, the evaluation by the user authentication means is carried out immediately after the authentication vector element product (AVEP) is received from the server.

Since secrets K and PK are not available to the server authentication means at the time when it receives the authentication vector element product (AVEP) from the user authentication means, the evaluation is performed later, when the secret K and then the secret PK are transferred to the server authentication means.

In one preferred embodiment of the invention, the authentication vector elements AVE(k) and AVE(pk) and the reference values of the authentication vector element (AVER) are calculated using one-way transformation applied to the pair CPuK (Public Key of (primary) Authentication Secret of User Authentication Means) and K—or to the CPuK and PK.

In one preferred embodiment of the invention, three interrelated secrets PK, K and NK are created, wherein NK is derived by a one-way cryptographic function, e.g. hash, from the secret K.

The second user authentication means derives the secret K from the transferred secret PK using a one-way cryptographic transformation, e.g. hash function, and transmits the secret K to the server authentication means.

The server authentication means derives the secret NK from the obtained secret K using the one-way cryptographic transformation, e.g. hash function, and transmits the secret NK to the first server authentication means.

The first user authentication means derives the secret K from the created secret PK, and the secret NK from the secret K, using the one-way cryptographic transformation, e.g. hash function, and verifies the derived secret NK using the secret NK obtained from the server authentication means.

In a preferred embodiment of the invention, the authentication vector contains at least one element the purpose of which is to eliminate an attacker at the time when the identity is created (initiated). Two server authentication means and one user authentication means and two interrelated secrets—K and PK—are used for this purpose. The first server authentication means creates a random secret PK and derives from it a secret K using a one-way cryptographic transformation, e.g. hash function.

The first server authentication means directly transmits the secret PK to the second server authentication means.

The second server authentication means derives the secret K from the obtained secret PK using the one-way cryptographic transformation, e.g. hash function.

To eliminate an attacker, it is further necessary to verify, in the correct order using the user authentication means, that the same secret K or PK is available to the server authentication means and also to verify using the server authentication means that the same secret K or PK is available to the user authentication means.

In relation to the subject of the invention, the situation is analogous to the previous embodiment of the invention, with the difference that when authentication vector elements AVE(k) and AVE(pk) are used, the user authentication means takes over the function of server authentication means and vice versa.

In a preferred embodiment of the invention, the authentication vector contains at least one element the purpose of which is to identify modification of the application by a malicious code (i.e. malware protection).

These elements use a FAM1(x) function wherein x is a parameter (challenge) and function FAM1(x) is a parametric signature of the image of the application to be verified. This function calculates a checksum (e.g. hash, MAC) of the application image from a permanent storage and signs the checksum together with the challenge (parameter x) using a primary authentication private key of the user authentication means.

A permanent set of key pairs or a single pair of asymmetric cryptography keys is available to the operating system where the function of private key reading is absent. There are only selected operations with the private key, which do not compromise the private key, and the operation of public key reading. One pair of keys is provided either for the entire operating system or one server authentication means.

Furthermore, the elements optionally use the FAM2(x) or FAM2(i, x) function wherein x is a parameter (challenge) and i is the index of the pair of keys used when a set of key pairs is used. The FAM(x) or FAM(i,x) function is a parametric signature of the application image in the main memory. When the software to be checked is loaded into memory, the operating system calculates a checksum (e.g. hash, MAC) of the loaded software and signs the checksum together with the challenge (parameter x) using the required private key (parameter i). The core of the operating system transmits the resulting value of FAM(x) or FAM(i,x) only to the software which the operating system started and whose checksum it used.

Furthermore, the elements optionally use a FS(x) or FS(i,x) function wherein x is a parameter (challenge) and i is the index of the pair of keys used when a set of key pairs is used. The FS(x) or FS(i,x) function is a parametric signature independent of the application image in the main memory. The function signs the challenge (parameter x) using the required private key (parameter i).

At least two authentication vector elements AVE(i) are used for verifying modification of the application code; we shall denote these elements as AM1, AM2, and, optionally, another two elements as AM3 and AM4.

Authentication vector element AM1 contains a checksum of the application image from a permanent storage, e.g. a disc.

Authentication vector element AM2 contains a parametric asymmetric signature of the checksum of the application image from a permanent storage signed by private key of primary authentication of user authentication means FAM1(x). Parameter x of the signature is represented by a SAS derivative.

Authentication vector element AM3 contains a parametrised checksum of the application image in the main memory signed by private key of the operating system FAM2(x) or FAM2(i, x) wherein x is the SAS derivative and i is the index assigned to the given server authentication means.

Authentication vector element AM4 contains a parameter signature signed by private key of the operating system FS(x) or FS(i,x) wherein x is the SAS derivative and i is the index assigned to the given server authentication means.

Since the server authentication means has no means for creating a reference signature but only means for verifying the signature created using asymmetric cryptography used in the FAM1, FAM2 and FS functions, authentication vector elements AM2, AM3 and AM4 must be transferred in an unchanged form from the user authentication means to the server authentication means and protected during transfer. Therefore, the authentication vector element product (AVEP) is calculated using the user authentication means for elements AM2, AM3 and AM4 using symmetric cryptographic transformation, e.g. by encryption using SAS.

The evaluation of the AM2, AM3 and AM4 elements using the server authentication means is performed by means of methods of verification of signature created using asymmetric cryptography. Reconstructed values of the AM2, AM3 and AM4 elements obtained e.g. through decryption using SAS by the server authentication means, and the relevant public keys and reference values of checksums and parameter x (SAS derivative) are used for verification.

In one preferred embodiment of the invention, three interrelated secrets—PK, K and NK—are created, wherein NK is derived by a one-way cryptographic function, e.g. hash, from secret K.

The second server authentication means derives the secret K from the obtained secret PK using a one-way cryptographic transformation, e.g. hash function, and transmits the secret K to the user authentication means.

The user authentication means derives the secret NK from the obtained secret K using the one-way cryptographic transformation, e.g. hash function, and transmits the secret NK to the first server authentication means.

The first server authentication means derives the secret K from the created secret PK, and the secret NK from the secret K, using the one-way cryptographic transformation, e.g. hash function, and verifies the thus obtained secret using the secret NK obtained from the user authentication means.

It is particularly preferred to combine some or all of the preferred embodiments described herein. This can be done by appropriately assigning authentication vector elements AVE(i) and by using a plurality of AVE(i) serving various purposes.

EXAMPLES OF CARRYING OUT THE INVENTION

Example 1

Example of use of a specific assignment of authentication vector elements AVE(i) and their use. The described system is depicted schematically in FIG. 1.

Figure 1:
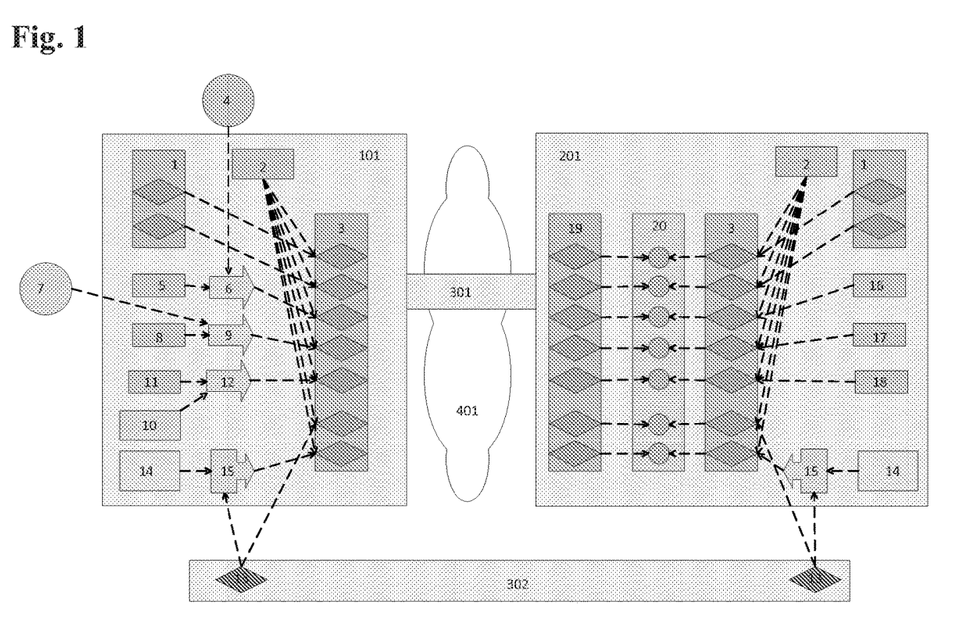
FIG. 1 schematically depicts the system according to example 1.

The first M Authentication vector elements AVE(1) to AVE(M) are used to provide protection against copying, Authentication vector element AVE(M+1) is used to verify the User-entered local factor (e.g. PIN or NFC card), Authentication vector element AVE(M+2) is used to verify a local area authentication factor (e.g. a WiFi hot spot), Authentication vector element AVE(M+3) to verify the User authentication means (e.g. verification of internal identification data of the User authentication means), Authentication vector element AVE(M+4) to authenticate the data channel, and Authentication vector element AVE(M+5) to eliminate an attacker through a data channel.

In case of creating a replica or in case of identity coming into existence, Authentication vector element AVE(M+6) and Authentication vector element AVE(M+7) are used for additional elimination of the attacker.

First, primary authentication between the User authentication means 101 and the Server authentication means 201 is performed, an Authenticated channel 301 is created via Non-secured network 401 between the User authentication means 101 and the Server authentication means 201, and Secondary authentication secret (SAS) 2 is also created being available to the User authentication means 101 and also to the Server authentication means 201.

The first M Authentication vector elements AVE(1) to AVE(M) use M AC-AVE(i) values 1 stored in the User authentication means 101. From the AC-AVE(i) values 1, using Secondary authentication secret (SAS) 2 of the User authentication means 101, a calculation is performed of M values of authentication vector element products 3 AVEP(i) of the User authentication means 101. After Local factor 4 is entered by the user, the entered value is used to decrypt Transformed value of the authentication vector element 5 of Local factor 4T-AVE(1). Decrypted value 6 of Local factor 4 is used as Authentication vector element AVE(M+1), i.e. the value of Authentication vector element product 3 AVEP (M+1) of the User authentication means 101 is calculated from Decrypted value 6 of Local factor 4 using. Secondary authentication secret 2 (SAS).

After determining the value of Local area authentication factor 7 from a device near the User authentication means 101, the ascertained value is used to decrypt Transformed value of the authentication vector element 8 of Local area authentication factor 7 T-AVE (2). Decrypted value 9 of Local area authentication factor 2 is used as Authentication vector element AVE(M+2), i.e. the value of Authentication vector element product 3 AVEP(M+2) of the User authentication means 101 is calculated from Decrypted value 9 of Local area authentication factor 7 using Secondary authentication secret (SAS) 2.

Internal identification data 10 of the User authentication means 101, e.g. serial number and MAC address of network interface, are used for decryption of Transformed value of the authentication vector element 11 of internal identification data 10 T-AVE(3). Decrypted value 12 of the Internal identification data 10 is used as Authentication vector element AVE(M+3), i.e. the value of Authentication vector element product 3 AVEP(M+3) of the User authentication means 101 is calculated from Decrypted value 12 of internal identification data using Secondary authentication secret (SAS) 2.

Non-authenticated data channel 302 created Data channel secret exporter 13 on its both ends. Data channel secret exporter 13 transferred to the User authentication means 101 is used as Authentication vector element AV E(M+4), i.e. the value of Authentication vector element product 3 AVEP(M+4) of the User authentication means 101 is calculated from Data channel secret exporter 13 using Secondary authentication secret (SAS) 2.

Derived value 15 is calculated using one-way cryptographic transformation (e.g. hash) from Data channel secret exporter 13 transmitted to the User authentication means 101 and Public key CPuK.of (primary) authentication secret 14 of the User authentication means 101, Derived value 15 is used as Authentication vector element AVE(M+5), i.e. using Secondary authentication secret 2 (SAS), the value of Authentication vector element product 3 AVEP (M+5) of the User authentication means 101 is calculated from the result of the one-way cryptographic transformation applied to Data channel secret exporter 13 and Public key CPuK of (primary) authentication secret 14 of the User authentication means 101.

As a result, the entire authentication vector product AVP is available on the User authentication means 101.

The Server authentication means 201 uses M AC-AVE(i) values 1 stored in the Server authentication means 201 as the relevant reference values of authentication vector element AC-AVER(i). Using Secondary authentication secret 2 (SAS) of the Server authentication means 201. M values of Authentication vector element products 1 AVEP(i) are calculated from AC-AVE(i) values 1 on the Server authentication means 201.

The Server authentication means 201 uses Reference value 16 of local factor LAF-RV(1) as Authentication vector element AVE(M+1), i.e. the value of Authentication vector element product 3 AVEP(M+1) on the Server authentication means 201 is calculated from Reference value 16 of Local factor LAF-RV(1) using Secondary authentication secret 2 (SAS).

The Server authentication means 201 uses Reference value 17 of local factor LAF-RV(2) as Authentication vector element AVE(M+2), i.e. the value of Authentication vector element product 3 AVEP(M+2) on the Server authentication means 201 is calculated from Reference value 17 of local factor LAF-RV(2) using Secondary authentication secret 2 (SAS).

The Server authentication means 201 uses Reference value 18 of local factor of the device LAF-RV(3) as Authentication vector element AVE(M+3), i.e. the value of Authentication vector element product 3 AVEP(M+3) on the Server authentication means 201 is calculated from Reference value 18 of local factor of the device LAF-RV(3) using Secondary authentication secret 2 (SAS).

Data channel secret exporter 13 transmitted to the Server authentication means 201 is used as Authentication vector element AVE(M+4), i.e. the value of Authentication vector element product 3 AVEP(M+4) on the Server authentication means 201 is calculated from Data channel secret exporter 13 using Secondary authentication secret 2 (SAS).

Derived value 15 is calculated using one-way cryptographic transformation (e.g. hash) from Data channel secret exporter 13 transmitted to the Server authentication means 201 and Public key CPuK of (primary) authentication secret 14 of the User authentication means. Derived value 15 is used as Authentication vector element AVE(M+5), i.e. using Secondary authentication secret 2 (SAS), the value of Authentication vector element product 3 AVEP (M+5) on the Server authentication means 201 is calculated from the result of the one-way cryptographic transformation applied to Data channel secret exporter 13 and Public key CPuK of (primary) authentication secret 14 of the User authentication means.

As a result, the entire Authentication vector product 3 AVP is available on the Server authentication means 201.

Using the previously created Authenticated channel 301 via Non-secured network 401 between the User authentication means 101 and the Server authentication means 201, the entire Authentication vector product 3 AVP is transferred from the User authentication means 101 to the Server authentication means 201 and used there as Input vector 19.

Each individual element of Input vector 19 is compared with the relevant Authentication vector element product 3 created on the Server authentication means 201. In case of a match, a positive evaluation is indicated in the relevant element of Result vector 20 and, if a match is not achieved, negative evaluation is indicated.

Result vector 20 is further processed by the Server authentication means 201 or transferred by the Server authentication means 201 to other systems for further processing.

Example 2

Example of use for further elimination of an attacker in creating a replica. The described system is depicted schematically in FIG. 2.

This example provides a description of the use of Authentication vector element AVE (M+6) and Authentication vector element AVE(M+7) for further elimination of an attacker. The described system is depicted schematically in FIG. 2. In the interest of clarity of description, other Authentication vector elements AVE are not described. An example of the manner of use of other Authentication vector elements AVE(i) is given in Example 1.

Figure 2:
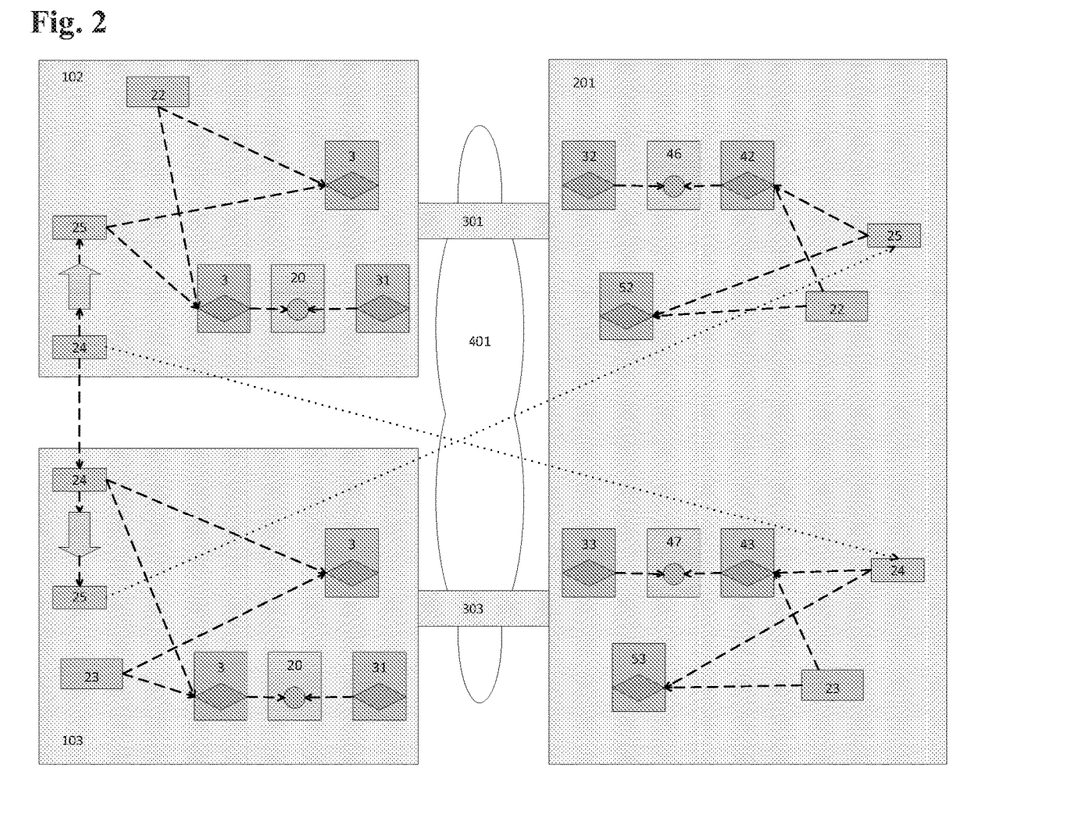
FIG. 2 schematically depicts the system described in example 2.

First, primary authentication between the First user authentication means 102 and the Server authentication means 201 is performed, the First authenticated channel 301 is created via Non-secured network 401 between the First user authentication means 102 and the Server authentication means 201, and the First secondary authentication secret 22 (SAS) is also created being available to both the User authentication means 102 and the Server authentication means 201.

The First user authentication means 102 generates the Secret PK 24. It transmits the Secret PK 24 directly to the Second user authentication means 103.

The First user authentication means 102 derives the Secret K 25 from Secret PK 24 using one-way cryptographic transformation, e.g. hash. The Second user authentication means 103 also derives the Secret K 25 from Secret PK 24 using asymmetric cryptographic transformation. At this time, the same pair of secrets, Secret PK 24 and Secret K 25, is available to both User authentication means 102, 103.

Primary authentication between the Second user authentication means 103 and the Server authentication means 201 also takes place, Second authenticated channel 303 is created via Non-secured network 401 between the Second user authentication means 103 and Server authentication means 201, and Second secondary authentication secret 23 (SAS) is also created being available to both the Second user authentication means 103 and the Server authentication means 201.

The First user authentication means 102 uses Secret K 25 as Authentication vector element AVE(M+6), i.e. the value of Authentication vector element product 3 AVEP(M+6) of the First user authentication means 102 is derived from the Secret K 25 using the First secondary authentication secret 22 (SAS).

Using the previously created First authenticated channel 301 via Non-secured network 401 between the User authentication means 102 and the Server authentication means 201. Authentication vector product 3 AVP is transferred from the First user authentication means 102 to the Server authentication means 201 and used there as the First input vector 32. The First input vector 32 is stored until the Secret K 25 is available to Server authentication means 201.

The Second user authentication means 103 uses the Secret PK 24 as Authentication vector element AVE(M+7), i.e. the value of Authentication vector element product 3 AVEP(M+7) of the Second user authentication means 103 is derived from the Secret PK 24 using the Second secondary authentication secret 23 SAS.

Using the previously created Second authenticated channel 303 via Non-secured network 401 between the Second user authentication means 103 and Server authentication means 201, Authentication vector product 3 AVP and also the Secret K 25 are transmitted from the Second user authentication means 103 to the Server authentication means 201 and used there as the Second input vector 33. The Second input vector 33 is stored until the Secret PK 24 is available to the Server authentication means 201.

At this time, the Secret K 25 is available to the Server authentication means 201. The Server authentication means 201 uses the Secret K 25 to evaluate Authentication vector element AVE(M+6), i,e, the value of First authentication vector element product 42 AVEP(M+6) is derived from the Secret K 25 using the First secondary authentication secret 22 (SAS). The said value is compared with the previously recorded value of the First input vector 32.

The Server authentication means 201 uses the Secret K 25 also to verify Authentication vector element AVE(M+6) in the reverse direction, i,e, the value of First authentication vector element product 52 AVEP(M+6) is calculated from Secret K 25 using the First secondary authentication secret 22 (SAS).

The First user authentication means 102 uses the Secret K 25 as Authentication vector element AVE(M+6), i.e. the value of Authentication vector element product 3 AVEP(M+6) on the First user authentication means 102 is derived from the Secret K 25 using the First secondary authentication secret 22 (SAS).

Using the previously created First authenticated channel 301 via Non-secured network 401 between the First user authentication means 102 and the Server authentication means 201, Authentication vector product 52 AVP is transmitted from the Server authentication means 201 to the First user authentication means 102 and used there as Input vector 31 of the First user authentication means 102.

In case of a match between Authentication vector element product 3 AVEP(M+6) on the First user authentication means 102 and the relevant item of Input vector 31, it is verified, amongst other things, that the correct value of the Secret K 25 is available to the Second user authentication means 103 and the Server authentication means 201.

Therefore, using the previously created First authenticated channel 301 via Non-secured network 401 between the First user authentication means 102 and the Server authentication means 201, the Secret PK 24 is transferred from the First user authentication means 102 to the Server authentication means 201.

At this time, the Secret PK 24 is available to the Server authentication means 201. The Server authentication means 201 uses the Secret PK 24 to evaluate Authentication vector element AVE(M+7), i.e. the value of Second authentication vector element product 43 AVEP(M+6) is calculated from the Secret PK 24 using the Second secondary authentication secret 23 (SAS). The said value is compared with the previously recorded value of the Second input vector 33. The Server authentication means 201 also uses the Secret PK 24 to verify Authentication vector element AVE(M+7) in the reverse direction, i.e. the value of Second authentication vector element product 53 AVEP(M+7) is derived from the Secret PK 24 using the Second secondary authentication secret 23 (SAS).

The Second user authentication means 103 uses the Secret PK 24 as Authentication vector element AVE(M+7), i.e. the value of Authentication vector element product 3 AVEP(M+

7) on the Second user authentication means 103 is calculated from the Secret PK 24 using the Second secondary authentication secret 23 (SAS).

Using the previously created Second authenticated channel 303 via Non-secured network 401 between the Second user authentication means 103 and the Server authentication means 201, Authentication vector product 53 AVP is transferred from the Server authentication means 201 to the Second user authentication means 103 and used there as Input vector 31 of the Second user authentication means 103.

In case of a match between Authentication vector element product 3 AVEP(M+7) on the Second user authentication means 103 and the relevant item of input vector 31, it is verified, amongst other things, that the correct value of the Secret PK 24 is available to the First user authentication means 102 and the Server authentication means 201.

In that case, the possibility of an attacker's presence on one of the two authenticated channels, i.e. on First authenticated channel 301 or on the Second authenticated channel, 303 is eliminated.

The invention claimed is:

1. A method of securing authentication in electronic communication between at least one user authentication means and at least one server authentication means, comprising the steps of:
    performing primary authentication in a first step of an authentication transaction, wherein a secondary authentication secret is created within said primary authentication and shared between the user authentication means and the server authentication means, wherein the secondary authentication secret is valid only for a given authentication transaction;
    creating a first authentication vector element product by using said secondary authentication secret as an input for a transformation, performed by the user authentication means separately on at least one authentication vector element (AVE(i)), wherein an authentication vector is an ordered set of authentication vector elements (AVE (i)),
    transferring the first authentication vector product from the user authentication means to the server authentication means; and
    evaluating the transferred first authentication vector product by the server authentication means using the secondary authentication secret,
    wherein a value of the authentication vector element (AVE (i)) is stored in the user authentication means and/or the value of the authentication vector element (AVE (i)) are entered into the user authentication means by the user or obtained from an information medium or from an outer environment before or during the authentication transaction, and/or the value of the authentication vector element (AVE (i)) are obtained before or during the authentication transaction from a transformed value of the authentication vector element (T-AVE(i)) using information entered by the user or obtained from an information medium or the outer environment, and an authentication vector element reference (AVER(i)) are stored in the server authentication means or obtained (AVER(i)) before or during the authentication transaction from an information medium or from the outer environment.

2. The method according to claim 1, comprising creating a second authentication vector product in the server authentication means from the authentication vector element reference (AVER(i)) value (AVER(i)) by using the secondary authentication secret as an input of cryptographic transformation performed by the server authentication means separately on each authentication vector element (AVE(i)), and comparing the first and the second authentication vector products.

3. The method according to claim 1, comprising subjecting, in the server authentication means, of each element of the first authentication vector product to a transformation inverse to the transformation used by the user authentication means and evaluating the result using the authentication vector element reference (AVER(i)) value.

4. The method according to claim 1, comprising using a plurality (M) of anti-copy authentication vector elements (AC-AVE(i)), wherein i=1 to M, the purpose of which is to detect copying of the user authentication means, assigning each of the anti-copy authentication vector elements (AC-AVE(i)) elements to one of previously performed authentications.

5. The method according to claim 1, comprising using at least one authentication vector element (AVE (i)), the purpose of which is to verify at least one local authentication factor, obtaining the value of the local authentication factor from the outer environment into the user authentication means, so that a local-factor authentication vector element reference (LF-AVER(i)) value stored on the server authentication means then corresponds either directly to the local authentication factor, or to information derived from the local authentication factor or to reference information, wherein if the local-factor authentication vector element reference (LF-AVER(i)) value is reference information, that reference information is independent of the local authentication factor.

6. The method according to claim 5, wherein the local-factor authentication vector element reference (LF-AVER (i)) value is a reference information, comprising initializing the relevant authentication vector element (AVE (i)) by obtaining a reference local authentication factor, thus obtaining local authentication factor reference value (LAF-RV(i)), and, subsequently, creating the local-factor authentication vector element reference (LF-AVER(i)) value pseudo-randomly from an authenticated shared secret, and applying a cryptographic transformation to the mutually corresponding values local authentication factor (LAF-RV(i)) and local-factor authentication vector element reference (LF-AVER (i)) value, subsequently, storing the result of said cryptographic transformation on user authentication means for further use and is not transferred to any other location, and calculating the local-factor authentication vector element reference (LF-AVER(i)) value on the server authentication means in the same manner from the authenticated shared secret.

7. The method according to claim 1, comprising using at least one authentication vector element (AVE(i)), the purpose of which is to authenticate a non-authenticated data channel, creating said authentication vector element (AVE (i)) so that the client part of the data channel creates a data channel secret exporter DCSE using a one-way transformation from an internal data channel secret, and also creating in the server part of the data channel an identical data channel secret exporter, wherein the user authentication means uses the thus obtained DCSE as the authentication vector element (AVE(i)) and the server authentication means uses the thus obtained DCSE as the authentication vector element reference (AVER(i)).

8. The method according to claim 1, comprising using at least one authentication vector element (AVE(i)), the purpose of which is to verify the user authentication means, wherein said authentication vector element (AVE(i)) is represented by a device identifier DI(i), and using DI(i) as the local authentication factor.

9. The method according to claim 1, comprising using at least one authentication vector element, the purpose of which is to eliminate an attacker by using a data channel, creating said element so that a data channel secondary secret (DCSS) is created using the data channel between the user part and the server part, calculating in the user authentication means the value of an authentication vector element (AVE (i)) using a one-way cryptographic transformation applied to the authentication secret client public key LCPuKI and to the data channel secondary secret (DCSS) value obtained from the user part, and calculating in the server authentication means an authentication vector element reference (AVER(i)) value using the same one-way transformation applied to the authentication secret client public key (CPuK) and the (DCSS) value obtained from the server part of the data channel.

10. The method according to claim 1, comprising using at least one authentication vector element (AVE (i)), the purpose of which is to eliminate an attacker using a replica, and using two user authentication means and one server authentication means and two interrelated secrets, said secrets being named "key (K)" and "predecessor key (PK)", comprising generating the first user authentication means a random secret predecessor key (PK) and, using a one-way cryptographic function, deriving from the secret predecessor key (PK) a secret key (K); transmitting by the first user authentication means the secret predecessor key (PK) to the second user authentication means, deriving in the second user authentication means the secret key (K) using one-way cryptographic transformation from the thus obtained secret predecessor key (PK), and subsequently, verifying the secret key (K) of the first user authentication means using the server authentication means, and then verifying the secret predecessor (PK) of the second user authentication means using the server authentication means; and subsequently, verifying the secret key (K) of the server authentication means by the first user authentication means, and, finally, verifying the secret predecessor key (PK) of the server authentication means by the second user authentication means.

11. The method according to claim 1, comprising using at least one authentication vector element (AVE(i)), the purpose of which is to eliminate an attacker during the creation of an identity, and using two server authentication means and one user authentication means and two interrelated secrets said secrets being named "key (K)" and "predecessor key (PK)", comprising generating in the first server authentication means a random secret predecessor key (PK) and, using a one-way cryptographic transformation, deriving a secret key (KU from the secret predecessor key (PK); directly transmitting by the first server authentication means the secret predecessor key (PK) to the second server authentication means; using the one-way cryptographic transformation, deriving in the second server authentication means the secret key (K) from the thus obtained secret predecessor key (PK), and subsequently, verifying the secret key (K) of the first server authentication means using the user authentication means, and, subsequently, verifying the secret predecessor key (PK) of the second server authentication means using the user authentication means, and subsequently, verifying the secret key (K) of the user authentication means by the first server authentication means, and, finally, verifying the secret predecessor key IPKI of the user authentication means by the second server authentication means.

12. The method according to claim 1, using authentication vector elements AVE(i), the purpose of which is to detect modification of the application by a malicious code, wherein said elements use an anti-malware function 1 (FAM1($x$)) function, wherein x is parameter and the anti-malware function 1 (FAM1($x$)) function is a parametric signature of the image of the application to be verified, wherein a permanent set of pairs of keys or a single pair of keys of asymmetric cryptography are optionally possessed by the operating system, wherein the function of private key reading is absent, instead, there are only selected operations with the private key, which do not compromise the private key and the operation of public key reading, wherein one pair of keys is provided either for the entire operating system or for one server authentication means; and, furthermore, the authentication vector elements optionally use an anti-malware function 2 (FAM2($x$) or anti-malware function 2 (FAM2($i$, $x$)) function, wherein x is parameter and i is the index of the pair of keys when a set of key pairs is used, and the anti-malware function (FAM(x)) or the anti-malware function (FAM(i,x)) function is a parametric signature of the application image in the main memory, and furthermore, the authentication vector elements optionally use a functional signature (FS(x)) or functional signature (FS(i,x)) function, wherein x is parameter and i is the index of the pair of keys when a set of key pairs is used, and the functional signature (FS(x) or functional signature (FS(i,x)) function is a parametric signature independent of the application image in the main memory, comprising using at least two authentication vector elements anti-malware authentication vector element 1 (AM1, anti-malware authentication vector element 2 (AM2), or optionally additional two elements anti-malware authentication vector element 3 (AM3) and anti-malware authentication vector element 4 (AM4), for detecting modification of the application by a malicious code, wherein anti-malware authentication vector element 1 (AM1) contains a checksum of the application image in a permanent storage, anti-malware authentication vector element 2 (AM2) contains a parametric asymmetric signature of the checksum of the application image from a permanent storage signed by the primary authentication private key of the user authentication means anti-malware authentication vector element 1 (AM1($x$)), wherein the parameter x of the signature is represented by secondary authentication secret derivative, anti-malware authentication vector element 3 (AM3) contains a parametrised checksum of the application image in the main memory signed by the operating system private key anti-malware function 2 (FAM2($x$) or anti-malware function 2 (FAM2($i$, $x$)), wherein x is secondary authentication secret derivative and i is the index assigned to the given server authentication means, and anti-malware authentication vector element 4 (AM4) contains the parameter signature signed by the operating system private key, functional signature (FS(x)) or functional signature (FS(i, x)), wherein x is secondary authentication secret derivative and i is the index assigned to the given server authentication means, and calculating the elements of the first authentication vector element product corresponding to elements anti-malware authentication vector element 2 (AM2), anti-malware authentication vector element 3 (AM3), anti-malware authentication vector element 4 (AM4) using symmetrical cryptographic transformation.

13. The method of claim 1, when said transformation is a cryptographic transformation.

14. The method according to claim 4, comprising deriving each of the AC-AVE(i) elements from the secondary authentication secret relating to the previously performed transformation.

15. The method according to claim 6, wherein the authenticated shared secret is a secondary authentication secret.

16. The method according to claim 6, comprising encrypting local-factor authentication vector element reference (LF-AVER(i)) using local authentication factor reference value (LAF-RV(i)).

17. The method according to claim 6, wherein calculating the the local-factor authentication vector element reference (LF-AVER(i)) on the server authentication means in the same manner from the authenticated shared secret comprises calculating the local-factor authentication vector element reference (LF-AVER(i)) from the secondary authentication secret stored on the server authentication means.

* * * * *